US010152655B2

(12) United States Patent
Krishnamurthy et al.

(10) Patent No.: US 10,152,655 B2
(45) Date of Patent: Dec. 11, 2018

(54) DEEP-LEARNING NETWORK ARCHITECTURE FOR OBJECT DETECTION

(71) Applicant: Adobe Systems Incorporated, San Jose, CA (US)

(72) Inventors: Balaji Krishnamurthy, Noida (IN); Mausoom Sarkar, New Delhi (IN)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 15/980,588

(22) Filed: May 15, 2018

(65) Prior Publication Data
US 2018/0260664 A1 Sep. 13, 2018

Related U.S. Application Data

(63) Continuation of application No. 15/253,261, filed on Aug. 31, 2016.

(51) Int. Cl.
G06K 9/62 (2006.01)
G06N 3/08 (2006.01)
G06N 3/04 (2006.01)
G06F 17/30 (2006.01)

(52) U.S. Cl.
CPC ............ *G06K 9/6269* (2013.01); *G06N 3/04* (2013.01); *G06N 3/08* (2013.01); *G06F 17/30244* (2013.01); *G06F 17/30867* (2013.01)

(58) Field of Classification Search
None
See application file for complete search history.

(56) References Cited

U.S. PATENT DOCUMENTS

| 2004/0252882 A1 | 12/2004 | Krumm |
| 2006/0088207 A1 | 4/2006 | Scneiderman |
| 2017/0083792 A1 | 3/2017 | Rodriguez-Serrano et al. |
| 2017/0154212 A1 | 6/2017 | Feris |

OTHER PUBLICATIONS

Notice of Allowance from related U.S. Appl. No. 15/253,261, dated Feb. 16, 2018, 7 pages.

*Primary Examiner* — Sumati Lefkowitz
*Assistant Examiner* — David Perlman
(74) *Attorney, Agent, or Firm* — Kilpatrick Townsend & Stockton LLP

(57) ABSTRACT

Systems and methods are disclosed herein for automatically identifying a query object within a visual medium. The technique generally involves receiving as input to a neural network a query object and a visual medium including the query object. The technique also involves generating, by the neural network, representations of the query object and the visual medium defining features of the query object and the visual medium. The technique also involves generating, by the neural network, a heat map using the representations. The heat map identifies a location of pixels corresponding to the query object within the visual medium and is usable to generate an updated visual medium highlighting the query object.

19 Claims, 13 Drawing Sheets
(4 of 13 Drawing Sheet(s) Filed in Color)

DEEP-LEARNING NETWORK ARCHITECTURE FOR OBJECT DETECTION

CROSS-REFERENCE TO RELATED APPLICATIONS

This application is a continuation of U.S. patent application Ser. No. 15/253,261, filed on Aug. 31, 2016, now allowed, the contents of which are incorporated herein by reference.

TECHNICAL FIELD

This disclosure relates generally to computer-implemented methods and systems for object detection and more particularly relates to a deep-search neural network architecture for object detection.

BACKGROUND

Digital Asset Management (DAM) systems are used to collect and store images, videos, or other visual media. In some applications, a client accesses the DAM system to search, download and use the images and videos for advertisements and marketing purposes. However, a client may wish to use a particular object within an image or video. For instance, in an example involving a source image depicting a model wearing a particular dress or article of clothing, a client may wish to modify or otherwise use the image portion depicting the dress or other article of clothing worn by a model. In addition to the article of clothing, the image may also include the model wearing the article of clothing, and a background scene. Due to the number of objects (e.g., the model, the background scene) included in the source image in addition to the desired object (e.g., the dress), a conventional image search is unable to generate an image including the particular article of clothing without other objects from the source image. It is desirable for a system to allow a client to search for a desired object within visual media containing multiple objects.

Further, in some instances, because a desired object is included within a visual medium (e.g., an image or video), the object has undergone distortions that cause the object to be discounted in an image search. For example, the object includes a resolution that causes it to be unrecognizable as the desired object during an image search by a machine-learning algorithm. These distortions prevent machine-learning algorithms from being properly trained to recognize a desired object that is distorted within a visual medium.

In some applications, data scarcity (e.g., an insufficient number of training images) prevents deep learning by a machine-learning algorithm to identify desired objects from an image. For example, a dataset of visual media used to train a system lacks sufficient examples of some images of a particular category to allow the system to recognize images within the category. Thus, it is also desirable for a system to expand a smaller dataset of images to a larger dataset having a sufficient amount of images to appropriately train the system.

SUMMARY

Certain aspects of the present disclosure involve automatically identifying a query object (e.g., an apparel item depicted in an image) within a visual medium (e.g., an image or a video in which the query object is displayed). In some aspects, a query object and a visual medium are received as input to a neural network to generate a heat map identifying a location of pixels corresponding to the query object within the visual medium. The neural network generates representations of the query object and the visual medium. The representations include a vector having values defining the features of the query object and the visual medium. The representations are convolved to generate the heat map.

Additional aspects of the present disclosure involve generating an expanded dataset of images from a smaller dataset of images. The expanded dataset increases the number of images available to train a neural network to perform tasks, such as recognition of objects within a visual medium. A mask corresponding to an image included in the original smaller dataset is extracted from the image. A cutout of the image is identified using the mask and augmented to generate a synthetic image, such as the image being overlaid on a new background. In some examples, augmenting the image also includes transforming or otherwise distorting the features of the image (e.g., blurring, occluding, tearing). The original dataset is expanded to include the synthetic image in an expanded dataset for training the neural network.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings. The patent or application file contains at least one drawing executed in color. Copies of this patent or patent application publication with color drawing(s) will be provided by the Office upon request and payment of the necessary fee.

DETAILED DESCRIPTION

Figure 1:
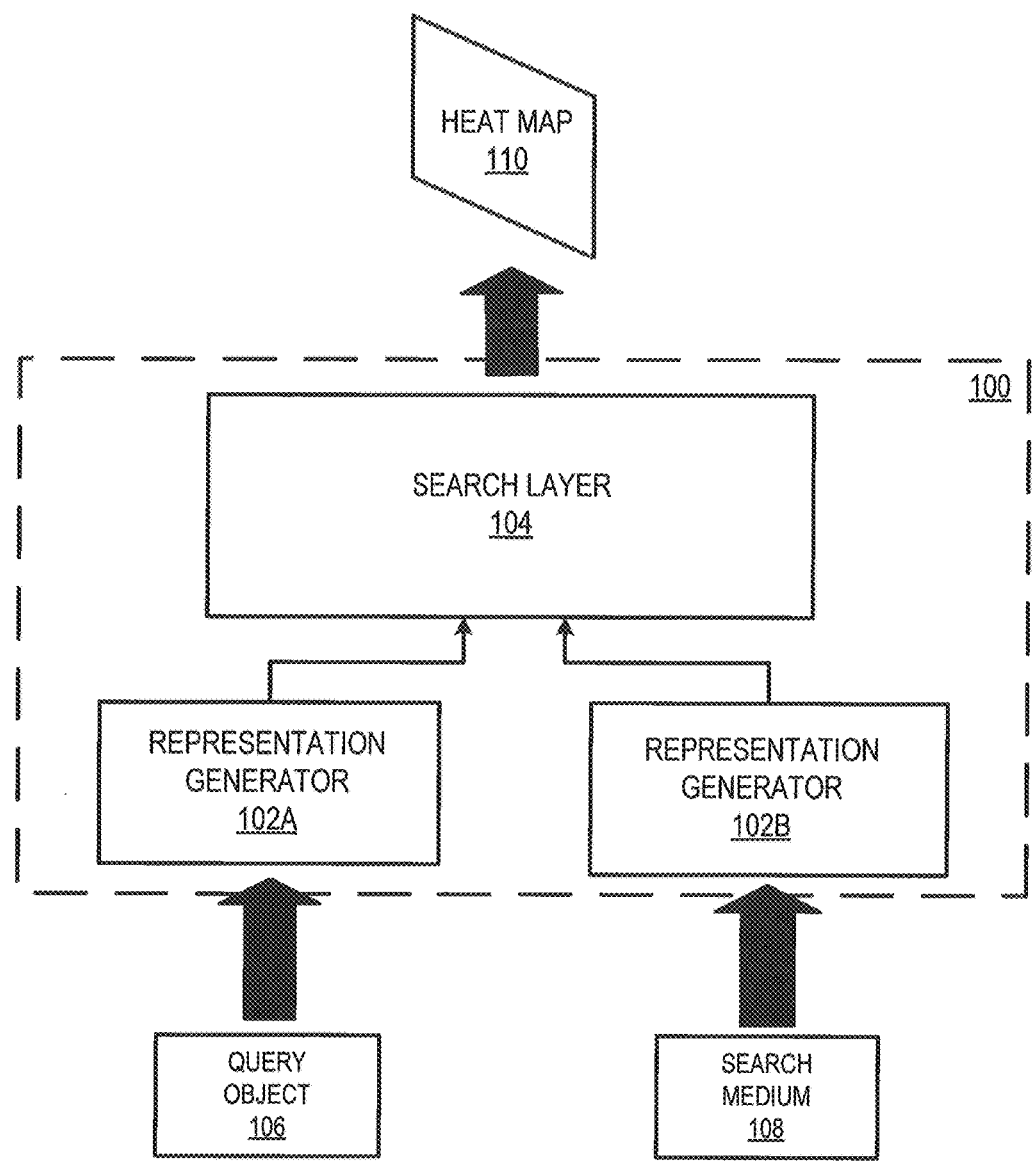
FIG. 1 is a block diagram depicting an example of a network architecture for generating a heat map identifying a location of a query object within a search medium according to an aspect of the present disclosure.

Certain aspects and examples of the present disclosure relate to a neural network architecture for generating a heat map identifying a location of an query object within a search medium. The architecture is a deep-learning neural network (e.g., a network of neurons including multiple processing layers) for receiving, as inputs, both a query object (e.g., an image to be searched for) and a search medium (e.g., an image or video including one or more instances of the query object). A first layer, or a first set of layers, of the neural network includes one or more representation generators, which receive the query object and the search medium. The representation generators are configured to generate representations (e.g., feature maps) of the features of the query object and the search medium. The representations correspond to vectors having values corresponding to the features of the query object and the search medium.

The representations are routed through a search layer of the network. In some aspects, the search layer includes a convolutional neural network for locating the representation of the query object within the representation of the search medium. The search results in a heat map generated by the search layer that identifies the location of the query object within the search medium. The heat map is used to highlight the query object in the search medium. In some aspects, multiple search layers are included in the network architecture to generate multiple heat maps corresponding to different scales of the query object. The heat maps are pooled and routed through additional convolutional layers to identify the query object within the search medium despite having a resolution that is different from the query object input into the neural network.

In certain applications of the neural network, a training dataset of images is expandable to generate a larger dataset of images for training the neural network to detect or identify distorted objects in a visual medium. To expand the training dataset, masks of objects are extracted from one or more of the images in the dataset. A cutout of each mask is augmented one or more times to create synthetic images that are added to the dataset to expand the number of images in the dataset.

The synthetic images added to the training dataset also expand the number of images corresponding to particular categories of objects (e.g., the categories associated with the augmented masks). The expanded dataset is usable to train the neural network to actuate a deeper search of the neural network for query objects by searching for and accurately identifying distorted versions of the query objects. In this manner, the expanded dataset improves the accuracy of one or more of automated detection, location, and classification of objects in visual media. In some aspects, the expanded dataset also allows for self-tuning of the neural network. Self-tuning involves using the dataset for training the neural network to continue expanding the dataset by automatically extracting additional masks from images in the dataset to generate additional synthetic images.

Certain aspects of the neural network architecture also provide improvements over conventional neural networks. For example, the neural network is configured to accept multiple inputs (e.g., a query object and a search medium) to allow the neural network to identify a query object within a search medium. The representations of the inputs corresponding to different scales of the query object or search medium, or both, are pooled and routed through multiple convolutional search layers that allow the query object to be identified despite the query object being distorted in the search medium. These features of the neural network are particularly useful in applications such as shoppable media or facial recognition where the desired object to be identified (e.g., an apparel item, a human face) are likely distorted or included in a cluttered search medium. For example, the improved neural network according to aspects of the present disclosure allows an unembodied image of a jacket input into the neural network to be identified in an image or video including a model wearing the jacket.

As used herein, the phrase "query object" refers to an image. Such an image includes, but is not limited to, a photograph, a scanned image, a frame of a video or animation, a drawing, a cartoon, or any other compilation of adjacent pixel or image data in which an object is depicted.

As used herein, the phrase "search medium" refers to a visual medium including one or more objects. Such a visual medium includes, but is not limited to, a photograph, a scanned image, a video or animation, a frame of a video or animation, a drawing, a cartoon, or any other compilation of image data or video data in which one or more objects is depicted.

As used herein, the phrase "feature map" refers to a representation of features of an image or other visual medium. Such a representation includes, but is not limited to, a vector having values representing different visual content from the visual medium. For example, in an image of a tree, a feature map includes a vector having numerical values representing a trunk, branch, or leaf of the tree. The vector is usable in operations, such as classifying or identifying a visual medium.

As used herein, the phrase "convolutional neural network" refers to a network of neurons that are layered for processing visual media. The neurons forming the network correspond to nodes in a structure representing the network. In some aspects, the neurons are mapped to image-related tasks, such as predicting classifying or locating object in a visual medium.

As used herein, a "training dataset" represents a set of known data (images with known labels) usable for training. Training involves minimizing loss functions such that the convolutional neural network learns the best or most optimized representations of known data that satisfy a training task (e.g., what features from the images represent a label at a minimal cost).

As used herein, the phrase "segmenting" an object in an image or portion of the image refers to identifying at least one object or portion of at least one object in the image or portion of the image.

As used herein, the phrase "mask" refers to a segmentation of an image or portion of an image. A mask generally defines the boundary or portion of the boundary of the object in an image. In some aspects, a mask is graphically depicted using an outline of the object or by displaying the object in one color (e.g., white) and the surrounding background in another color (e.g., black).

As used herein, the phrase "heat map" refers to a graphical representation of a visual medium forming a matrix in which the individual values contained in the matrix are represented by colors. In some aspects, the individual values correspond to the location of a query object within a search medium. In some contexts, the terms "mask" and "heat map" are used interchangeably to refer to a graphical representation of a visual medium identifying a location of an object.

FIG. 1 shows an example of a search network architecture 100 according to aspects of the present disclosure. The search network architecture 100 is a convolutional neural network implemented through a processing device executing instructions stored in computer-readable medium. The convolutional neural network includes representation generators 102A, 102B and a search layer 104. The representation generators 102A, 102B represent an input layer of the search network architecture 100. The processor, through the representation generators 102A, 102B, receives visual media, such as a query object 106 and a search medium 108. In some aspects, the representation generator 102A receives the query object 106 and the representation generator 102B separately receives the search medium 108 as a separate input. Although separate representation generators 102A, 102B are shown, the search network architecture 100, in some aspects, includes any number of representation generators, including one, for generating separate representations of each input. Similarly, though one search layer 104 is shown, the search network architecture 100, in some aspects, includes any number of search layers, or multiple sublayers forming the search layer 104.

The representation generators 102A, 102B include neurons trained to generate a representation of the features of the input. The representation corresponds to a feature map including a feature vector having values representing the features of the input. In some aspects, the representation generators 102A, 102B match the feature vector to at least one known feature vector from a feature space of known images and associated knowledge about the known images (e.g., labels, tags, indexes, and other data describing the images). In one example, the matching uses a nearest neighbor algorithm executed by the processing device. Knowledge about the known image is transferred to the image to determine the values corresponding to the features of the input.

The search layer 104 represents a second layer of the search network architecture 100. The search layer 104 is implemented through the processing device to receive the output of the representation generators 102A, 102B. The search layer 104 includes neurons trained to use the representations of the query object 106 and the search medium 108 to identify the location of the query object 106 within the search medium. In some aspects, the neurons in the search layer 104 create dynamic convolutional kernels, or matrices. For example, the neurons in the search layer 104 learn to generate a query-object-dependent kernel including values that are used to search for the representation of the query object 106 in the representation of the search medium 108. The search layer 104 outputs a kernel corresponding to a heat map 110. The heat map 110 identifies the location of pixels corresponding to the query object 106 observable in the search medium 108. The heat map 110 is used to highlight the query object 106 in the search medium 108.

Figure 2:
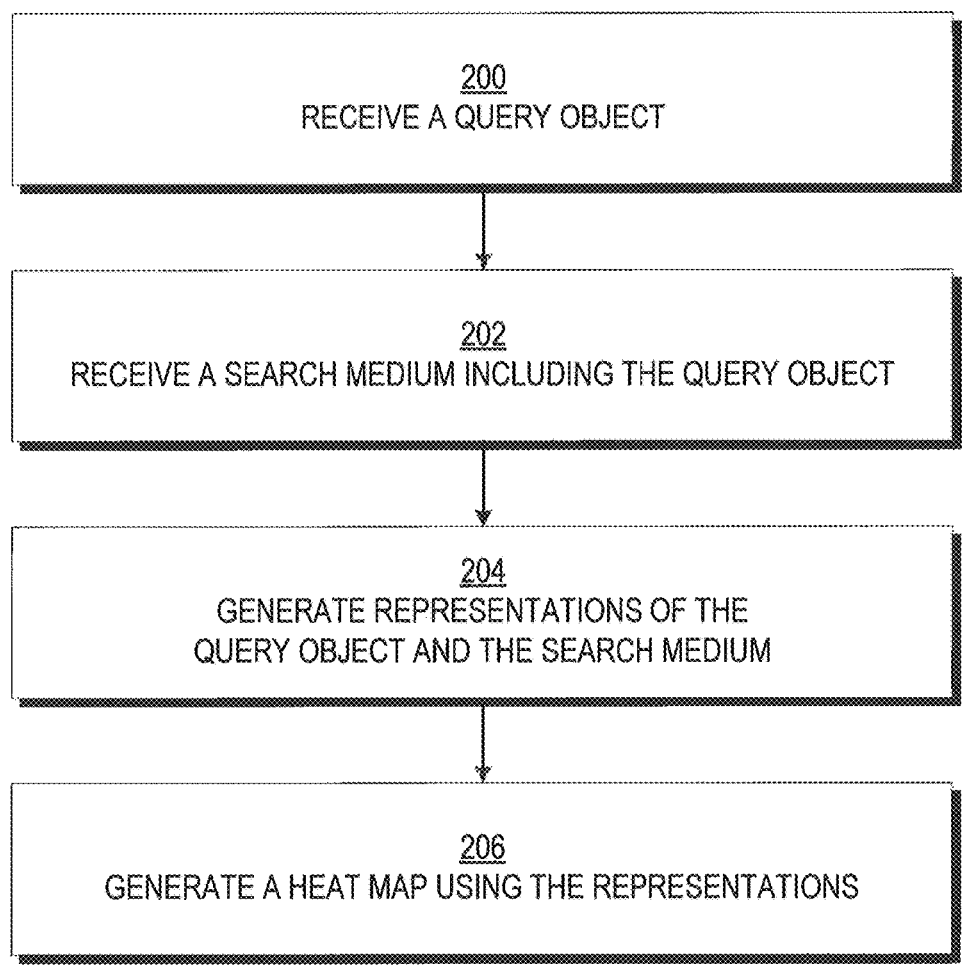
FIG. 2 is a flow chart of a process for generating a heat map using the network architecture of FIG. 1 according to an aspect of the present disclosure.

FIG. 2 is a flow chart of a process for generating the heat map 110. The process is described with reference to the search network architecture 100 of FIG. 1, though other implementations are possible without departing from the scope of the present disclosure.

In block 200, the query object 106 is received by a processing device. The query object 106 is received at an input of the representation generator 102A. In some aspects, the query object 106 is received from local storage of a computer system or from a remote storage accessible over a data network. The query object 106 corresponds to an image of an object to be identified in the search medium 108.

In block 202, the search medium 108 is received by the processing device. The search medium 108 is received at the input of the representation generator 102B implemented by the processing device. The search medium 108 is a visual medium that includes the query object 106. Similar to the query object 106, the search medium 108, in some aspects, is received from local storage of a computer system or from a remote storage accessible over a data network. The search medium 108 corresponds to an image or video in which the query object 106 is located.

Figure 3:
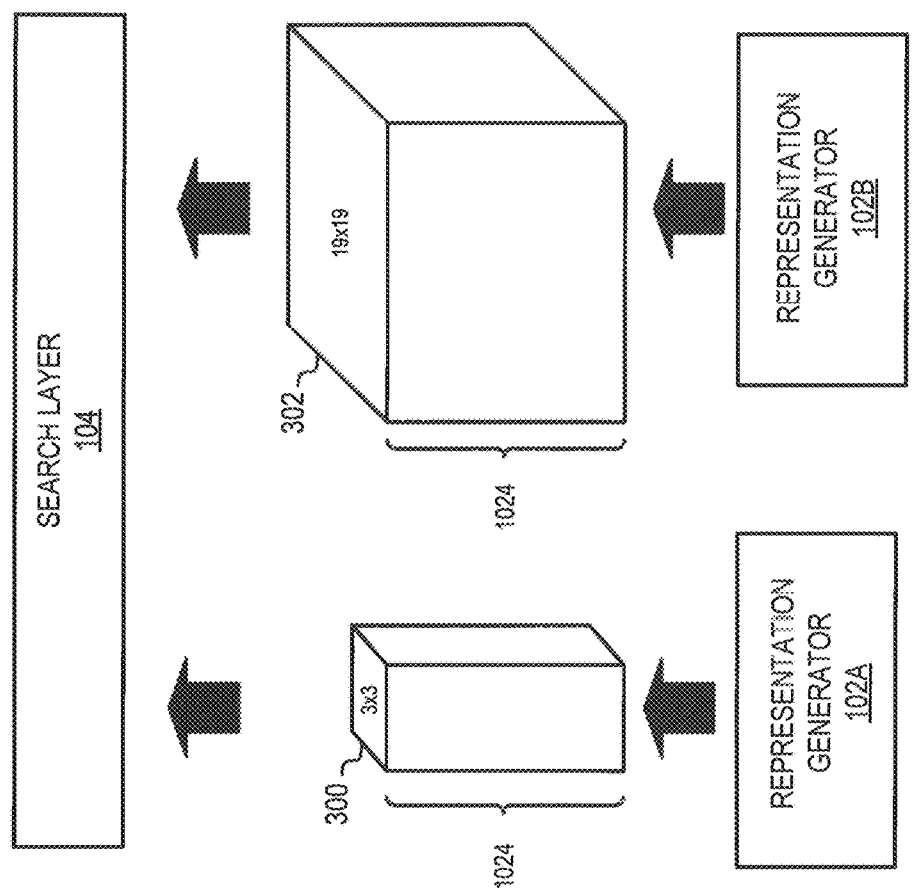
FIG. 3 is a diagram depicting an example of figure maps generated by the network architecture of FIG. 1 according to an aspect of the present disclosure.

In block 204, representations of the query object 106 and the search medium 108 are generated. The representations are generated by the processing device though the representation generators 102A, 102B and correspond to feature maps of the query object 106 and the search medium 108, respectively. FIG. 3 shows an example of representations 300, 302 generated by the representation generators 102A, 102B, respectively. The representations 300, 302 include a feature map having values corresponding to features of the query object 106 and the search medium 108, respectively. The spatial dimensions of the representation 300 corresponding to the query object 106 are smaller than the spatial dimensions of the representation 302 corresponding to the search medium 108. In some aspects, the depth (e.g., the number of channels) of the representations 300, 302 is the same. For example, in FIG. 3, the representation 300 has spatial dimensions of 3×3×1024. The representation 302 has spatial dimensions of 19×19×1024. In some aspects, the representation generators 102A, 102B reduces the spatial dimensions of the representations 300, 302, respectively, such that the representations 300, 302 have smaller dimensions than the query object 106 and search medium 108 from which they were generated. The representations 300, 302 is input to the search layer 104. The search layer 104 receives the representation 300, 302 from representation generators 102A, 102B. The representation 300 corresponding to the query object 106 becomes a convolution kernel within the search layer 104 and applied onto the representation 302 of the search medium 108.

Returning to FIG. 2, in block 206, the heat map 110 is generated by the processing device using the representations 300, 302. The search layer 104 receives the representations 300, 302 of the query object 106 and the search medium 108, respectively, as separate inputs to generate the heat map 110. In some aspects, the search layer 104 includes a convolutional neural network. The convolutional neural network includes neurons trained to identify a convolutional kernel corresponding to the representation 300 applied on the representation 302. In additional and alternative aspects, the search layer 104 implements a dot product of the convolutional kernel corresponding to the representation 300 with each overlapping section of the representation 302. The dot product for each overlapping section is, optionally, normalized. For example, each dot product is divided by the $L^2$ norms of the representation's 300, 302 intersecting volumes.

In some aspects, the convolution kernel of representation 300 applied on representation 302 is performed using the following relationship stored in a memory device accessible to the processing device:

$$\sum_{m=0}^{m<V}\sum_{l=0}^{l<U}\sum_{c=0}^{c<C} R1(l, m, c)R2(x+l, y+m, c),$$

for $0 \le x < W-U+1$, $0 \le y < H-V+1$.

R1 and R2 are the representations 300, 302, U, V, and C are the spatial dimensions of the representation 300, W, H, C are the spatial dimensions of the representation 302, and l, m, c represent coordinates inside representation 300 and x, y, c represent coordinates inside representation 302.

Figure 4:
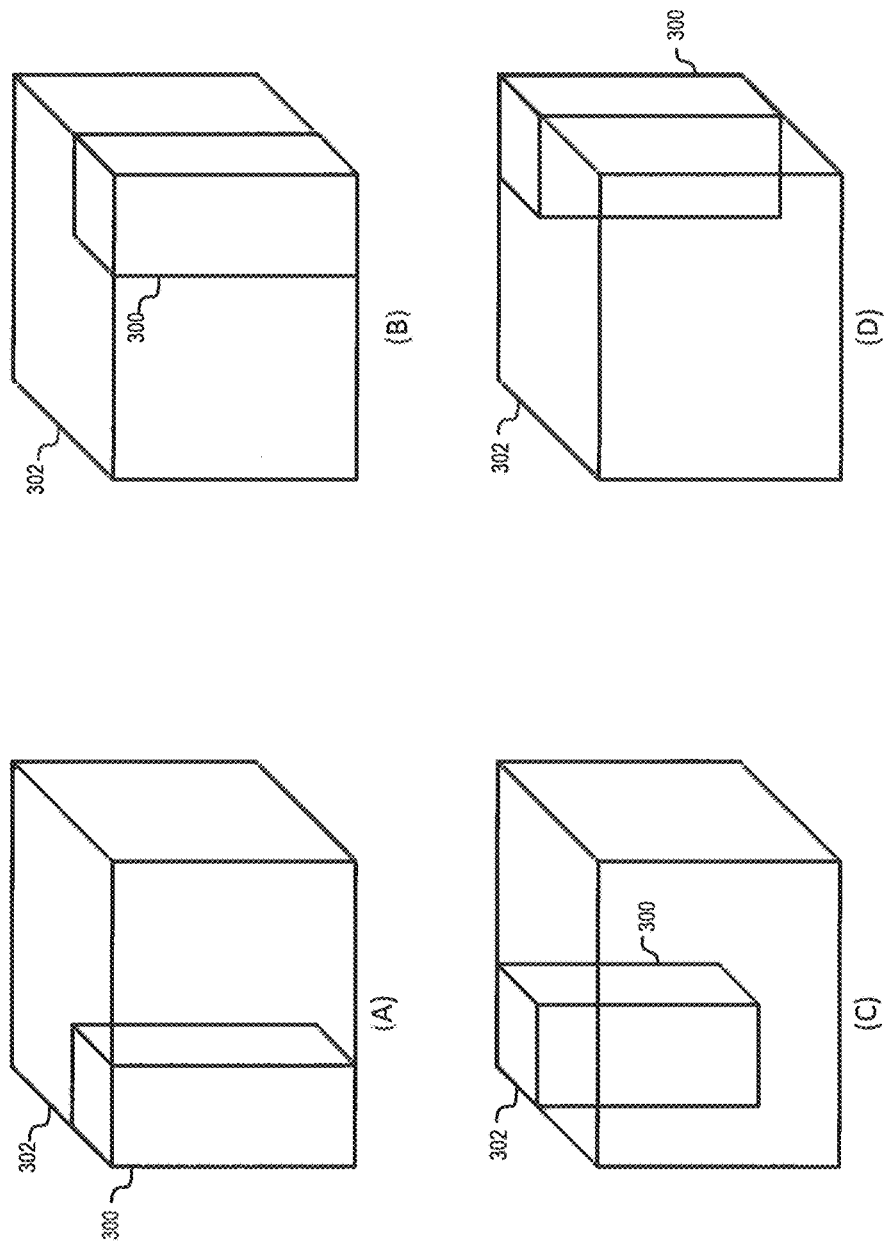
FIG. 4 depicts an example of how the network architecture of FIG. 1 uses representations of a query object and a search medium to generate a heat map according to an aspect of the present disclosure.

FIG. 4 shows the representations 300, 302 in different frames to visually illustrate the relationship between the representations 300, 302 during convolution. In operation, the representation 300 is positioned within and moved through the representation 302. Frame A of FIG. 4 shows the representation 300 positioned in an upper left corner of the representation 302. Frame B shows the representation 300 positioned in an upper right corner of the representation 302. Frame C shows the representation 300 positioned in a back left corner of the representation 302. Frame shows the representation 300 positioned in a back right corner of the representation 302. The representation 300 is moved through the representation 302 to each of the locations shown in frames A through D (and each position in between the locations) and an element-wise multiplication is performed, followed by a sum of the resulting elements. The result of the convolution of the representations 300, 302 is the heat map 110 identifying the location of the pixels representing the query object 106 within the search medium 108.

Figure 5:
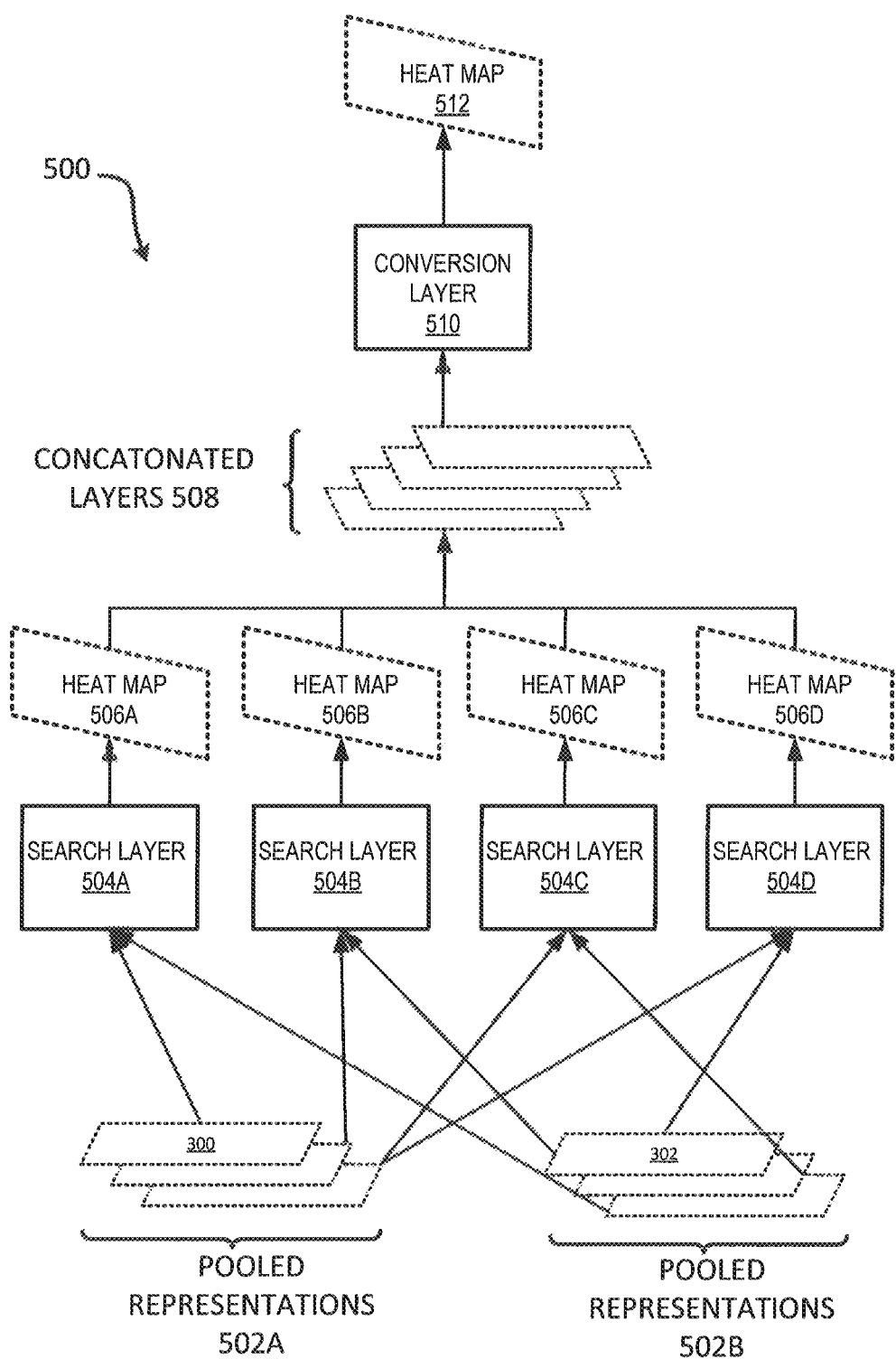
FIG. 5 is a flow block diagram depicting generating a heat map from a pooled set of feature maps through network architecture having multiple search layers according to an aspect of the present disclosure.

FIG. 5 is a flow diagram 500 illustrating pooled representations 502A, 502B being routed through a network architecture including multiple search layers 504A, 504B, 504C, 504D according to an aspect of the present disclosure. The multiple search layers 504A, 504B, 504C, 504D are trained to search for and identify the query object 106 within a search medium 108. In some aspects, the search layers 504A, 504B, 504C, 504D are included in the search network architecture 100 of FIG. 1 in addition, or alternative to, the search layer 104. The pooled representations 502A, 502B include multiple representations 300, 302 of the query object 106 and the search medium 108, respectively, stacked in a vertical fashion. For example, the pooled representations 502A includes representations 300 of the query object 106. Each of the representations 300 included in the pooled representations 502A is generated by the representation generator 102A of FIG. 1 to have a different image, scale, stride, or pitch. Similarly, the pooled representations 502B include representations 302 of the search medium 108 generated by the representation generator 102B of FIG. 1. Each representation 302 in the pooled representations 502B may be upsampled or downsampled, and have a different image scale. The respective scales of the representations 300, 302 in the pooled representations 502A, 502B allow the search layers 504A, 504B, 504C, 504D to search for the query object 106 at different resolutions.

In some aspects, the network architecture includes a different search layer 504A for each pair of representations 300, 302 from the pooled representations 502A, 502B. For example, the network architecture includes four search layers 504A, 504B, 504C, 504D such that each search layer receives a representation 300 from the pooled representations 502A and a representation 302 from the pooled representations 502B. Although four search layers 504A, 504B, 504C, 504D are shown, the network architecture includes any number of search layers to allow for pairs of representations 300, 302 to be routed to a different search layer.

In some aspects, the search layers 504A, 504B, 504C, 504D \ simultaneously searches for the inputted representation 300 within the inputted search medium 302 as described for the search layer 104 in FIG. 1. Each search layer 504A, 504B, 504C, 504D searches at different resolutions corresponding to the image scales of the inputted representations 300, 302. Each search layer generates a separate heat map 506A, 506B, 506C, 506D identifying the location of pixels corresponding to the inputted representation 300 in the inputted search medium 302. The heat maps 506A, 506B, 506C, 506D are pooled to create a stack of concatenated layers 508. In some aspects, the concatenated layers 508 are created by pooling the heat maps 506A, 506B, 506C, 506D in a similar manner as the representations 300, 302 are pooled to create the pooled representations 502A, 502B.

The concatenated layers 508 are input into a conversion layer 510. The conversion layer 510 includes an additional neural network including neurons trained to identify the query object 106 in the search medium 108. The conversion layer 510 outputs a heat map 512 that identifies the location of pixels of the query object 106 within the search medium 108. In some aspects, the conversion layer 510 effectively operates as an additional search layer and identifies the location of the query object 106 in the search medium 108 at different resolutions.

In additional and alternative aspects, the representation generator 102A generates a representation 300 as described in FIG. 1. The representation generator 102B generates multiple representations 302 to create the pooled representations 502B as described in FIG. 5. The representation generator 102B of FIG. 1 also generates additional representations 302 by up-sampling to zoom in on various portions of the search medium 108 that are pooled with the pooled representations 502B. The search layers 504A, 504B, 504C, 504D each take the representation 300 as a first input and one of the pooled representations 502B including the upsampled representations as a second input to generate the heat maps 506A, 506B, 506C, 506D.

Figure 6:
FIGS. 6 and 7 provide images illustrating a query object, a search medium and a search result yielded by an image search according to an aspect of the present disclosure.
Figure 7:
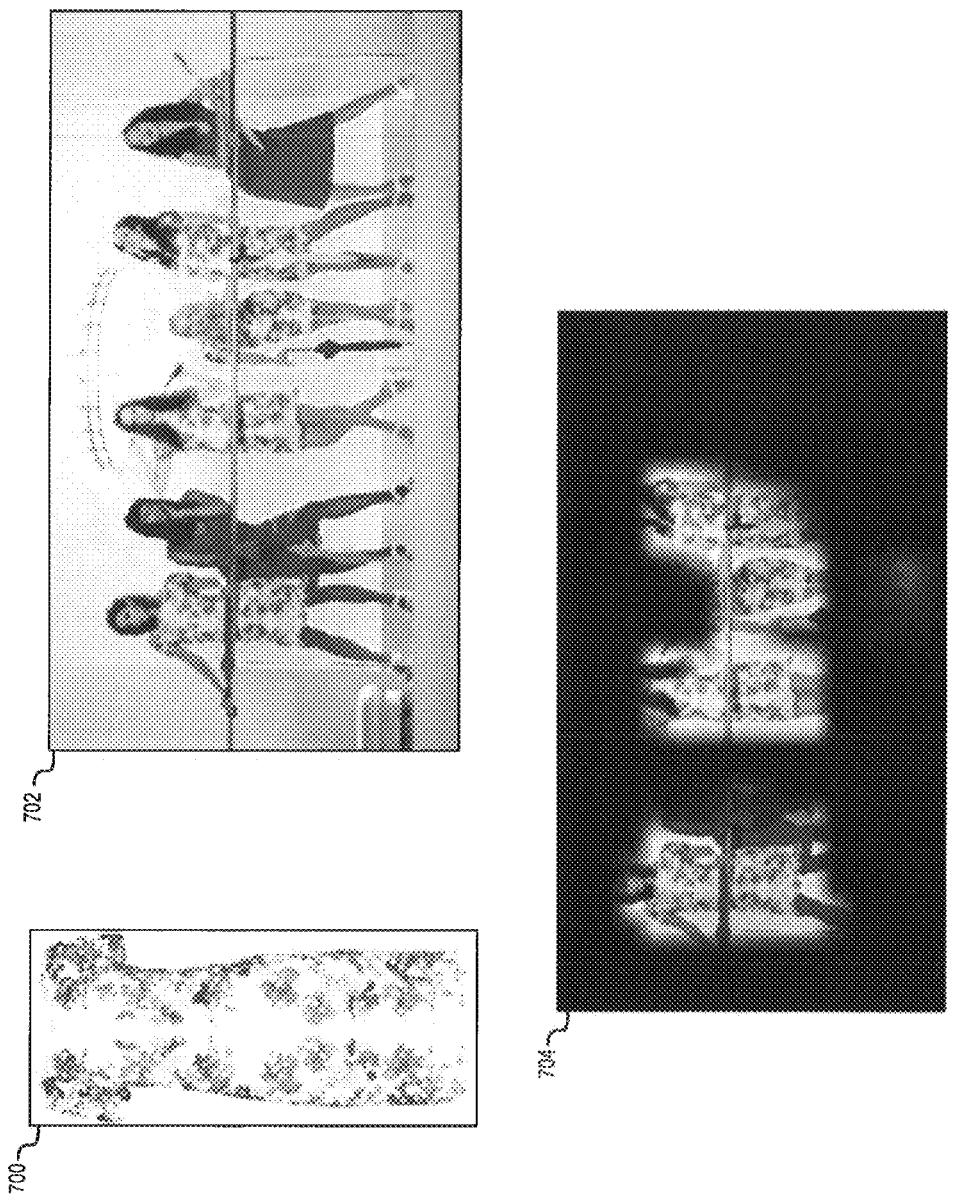

FIGS. 6 and 7 illustrate examples of using a neural network having a network architecture according to some aspects of the present disclosure to identify a query object 106 within a search medium 108. The neural network is able to locate and highlight objects that have undergone significant distortions and scale changes as indicated by the examples of FIGS. 6 and 7. In FIG. 6, the query object 106 corresponds to an image of a woman's jacket 600. The search medium 108 corresponds to a video frame 602 of a model wearing the jacket 600. In the video frame 602 are a number of objects including the model, additional people in the background of the image 602, luggage, and a revolving door. The jacket 600 and the video frame 602 are input into a neural network including the search network architecture 100 of FIG. 1 or the search layers 504A, 504B, 504C, 504D of FIG. 5 to generate a heat map identifying the pixels corresponding to the jacket 600 within the video frame 602. The heat map is used to identify the jacket 600 within the video frame 602. The image 604 illustrates an update of the video frame 602, showing only the pixels including and proximate to the jacket 600. In this example, the neural network is able to locate and highlight the jacket 600 worn in an open manner in the video frame 602 despite the query image 106 of the jacket 600 being closed and unembodied.

In some aspects, the neurons of the search layers 104, 504A, 504B, 504C, 504D of FIGS. 1 and 5 are trained to identify multiple instances of a query object 106 within a search medium 108. For example, FIG. 7 shows an image of a woman's dress 700. An image 702 includes multiple models wearing the dress 700. The image 702 also includes additional models wearing a different dress as well as other objects (e.g., a chandelier in the background of the image 702). The dress 700 and the image 702 are input in to a neural network according to aspects of the present disclosure as a query object 106 and a search medium 108, respectively. The neural network generates a heat map identifying the pixels corresponding to each instance of the dress 700 in the image 702. The heat map is used to identify each instance of the dress 700 within the image 702. The image 704 illustrates an update of the image 702, showing only the pixels including and proximate to the dress 700.

Training the Neural Network

In some aspects, the neurons included in neural networks described in FIGS. 1 and 5 are trained with input data corresponding to visual media to train the weights of the layers of the neural network. The visual media used for the training is input into the neural network in batches, or datasets.

Figure 8:
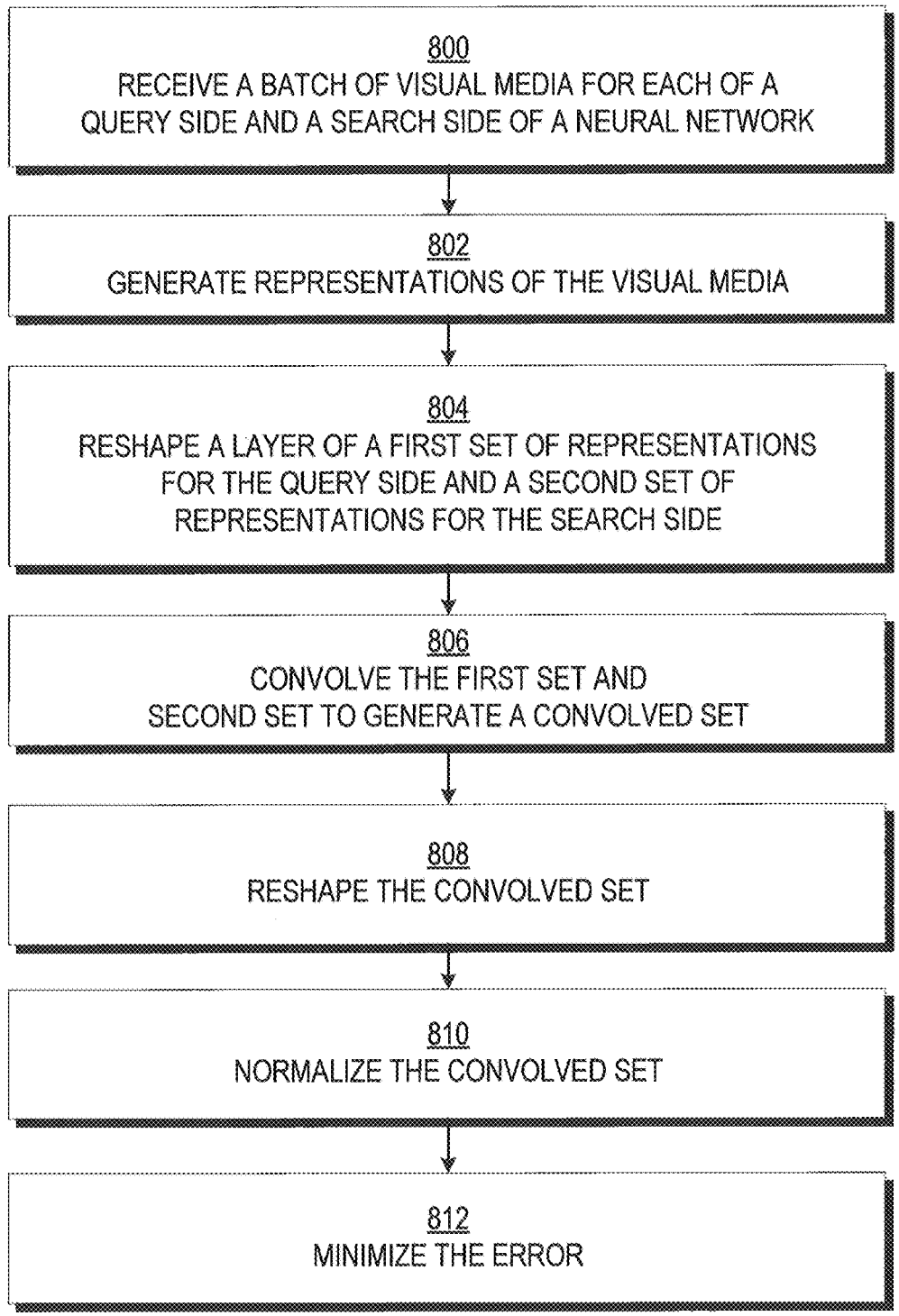
FIG. 8 is a flow chart of a process for training a neural network according to an aspect of the present disclosure.

FIG. 8 is a flow chart of a process for training a neural network according to an aspect of the present disclosure. The process is described with respect to the search network architecture 100 of FIG. 1, unless otherwise indicated, though other implementations are possible without departing from the scope of the present disclosure.

In block 800, a batch of visual media for each of a query side and a search side of a neural network is received. In some aspects, the query side of the neural network corresponds to the neurons positioned in the neural network to process the query object 106. The search side of the neural network corresponds to the neurons positioned in the neural network to process the search medium 108. For example, the representation generator 102A is included in the query side and the representation generator 102B is included in the search side. Each side receives a batch of visual media. For example, a batch received by the query side of the neural network includes a dataset of images of clothing usable to train the neural network to generate representations of clothing received as a query object 106.

In block 802, representations of the visual media are generated. In some aspects, the representations corresponds to a figure map including a vector having values representing the features of the visual media included in the batch.

Figure 9:
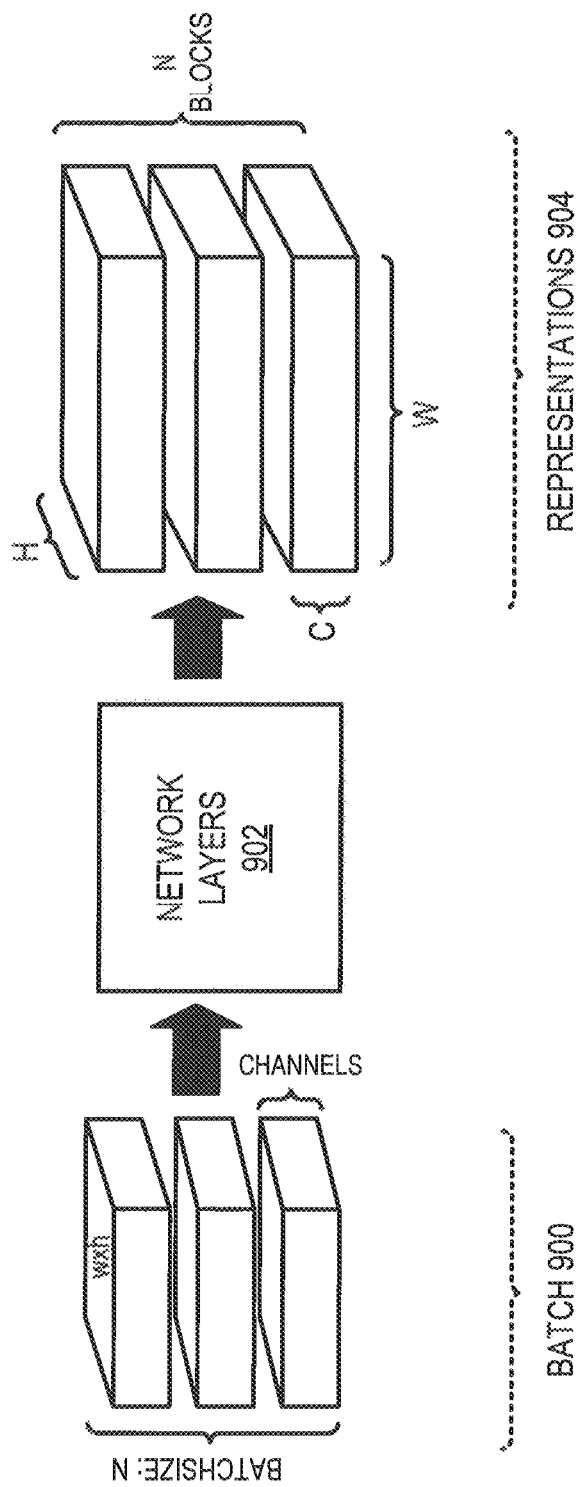
FIG. 9 is a flow diagram of creating representations of a batch of visual media for training a neural network according to an aspect of the present disclosure.

FIG. 9 is a flow diagram illustrating an example of a batch 900 received by one or more network layers 902 of a neural network. The batch 900 represents a dataset of images received by the query side or the search side of the neural network. In some aspects, the one or more network layers 902 include the representation generators 102A, 102B in the input layer of the search network architecture 100 of FIG. 1. The batch 900 includes a batch size N corresponding to the number images fed in simultaneously to the network layers 902. The images in the batch 900 include known values corresponding to the identity of labels for the image, the location of the subject matter of the image in relation to the background of the image, colors of the image, or other features of the image. The batch 900 includes multiple channels corresponding color channels of the images in the batch 900. Each channel includes spatial dimensions of a width w and a height h. The overall dimensions of the batch are N×Channels×w×h. The network layers 902 outputs representations having an overall dimension of N×C×W×H, where N corresponds to the batch size, C is the number of representations, or feature maps, per input of the batch 900, W is the width, and H is the height of the representations. In some aspects, the spatial dimensions of the batch 900 (w×h) equals the spatial dimensions of the representations 904. In other aspects, the spatial dimensions of the batch 900 are different from the spatial dimensions of the representations 904 (e.g., w≠W, h≠H).

Returning to FIG. 8, in block 804, a layer of representations 904 is reshaped for each of the query side and the search side of the neural network. Using the representations 904 illustrated in FIG. 9 as an example of a representation 904 for the search side of the neural network, the representation 904 includes the dimensions N×C×W×H. For purposes of the example, it is assumed that a representation for the query side includes smaller dimensions N×C×u×V, where U and V are less than W and H, respectively. The bottom layers of the respective representations are reshaped, or otherwise reinterpreted as, 1×NC×U×V for the query side and 1×NC×W×H for the search side. Reshaping the respective representations allows for handling of a batch of inputs to perform N number of independent C×U×V convolutions on N number of maps of dimension C×W×H using the existing convolutional layer.

In block 806, the representations for each side of the neural network are convolved. The representations are divided into N number of groups, each having dimensions 1×C×U×V and 1×C×W×H for the query side and the search side, respectively. Each group on the query side is convolved with a corresponding group on the search side to generate N number of convolved groups having dimensions 1×1×W'×H'. The convolved set of groups has dimensions 1×N×W'×H'.

In block 808, the convolved set is reshaped. For example, the dimensions 1×N×W'×H' are reshaped to N×1×W'×H'. The reshaping is performed to reinterpret one N channel×H' map as N number of maps of dimension 1 W'×H'. The reshaped convolved set corresponds to masks of the images in the batch 900 for the query side. In additional aspects, the reshaped convoluted set is input into another convolutional neural network to train the neurons in the network to produce a heat map identifying the location of the query object 106 in the search medium 108.

In block 810, the convolved set is, optionally, normalized. In some aspects, the $L^2$ norms of the representations 904 generated on the query side and the intersecting volumes of the representations 904 generated on the search side are calculated using known methods and divided by the reshaped convolved set from block 808. The $L^2$ norm for the query side includes, for example, one $L^2$ norm for each of the groups of representations 904 on the query side and result in N number of $L^2$ norms. The $L^2$ norm for the intersecting volumes on the search side are calculated by taking an element-wise square of the representations 904 on the search side and convolving the reshaped convolved set from block 808 with a unit kernel of dimension C×U×V. The element-wise square root of the result is the $L^2$ norm for the intersecting volumes on the search side.

In block 812, error with respect to the true mask or heat map is minimized. In some aspects, the mask or heat map is fed to a loss function to minimize the error. In one example, the loss function corresponds to a plain $L^2$ loss, which is computed by summing the pixel-wise $L^2$ loss. In another example, a spatially varying double margin loss uses a "MarginHigh" to push the "ON" pixels corresponding to pixels that show the presence of the query object 106 above a predefined threshold and a "MarginLow" to push the "OFF" pixels below a predefined threshold. The following relationship is included in memory accessible to the processing device and used to determine the double margin loss:

$$loss = \sum_{j=0}^{j<H} \sum_{i=0}^{i<W} y[i, j] * \max(H[i, j] - d[i, j], 0)^2 +$$

$$(1 - y[i, j]) * \max(d[i, j] - L[i, j], 0)^2,$$

where d[i,j] corresponds to the output of the search layer 104 at each pixel location, H[I,j] corresponds to the high threshold at the location, L[I,j] is the low threshold at the location, and y[i,j] is either a "1" representing the presence of the object or a "0" representing the absence of the object in the search medium 108.

Generating a Batch of Visual Media for Training the Neural Network

In some aspects, a neural network is trained in a supervised manner with the expected output corresponding to a mask or heat map over the search medium 108 identifying the location of the query object 106 in the search medium 108. In some aspects, datasets with accurate masks are publicly available and used to train the neural network. In other aspects, a dataset is created and potentially augmented.

In some aspects, a large dataset of images is needed to train a neural network. For example, an application for the neural network analyzes objects that have specialized categories and require that the neurons detect the present of a particular object and not just a broad category associated with the object (e.g., a particular piece of apparel to buy, marketing campaign imagery featuring a particular product). In such fine-grained applications, classifiers are difficult to train as the number of training images in each category is too low to teach the neural network to detect objects within the category. Also, in some examples, the object has undergone various distortions or is included on cluttered backgrounds that make object detection difficult without deep-learning of the neural network using a large dataset of images.

Figure 10:
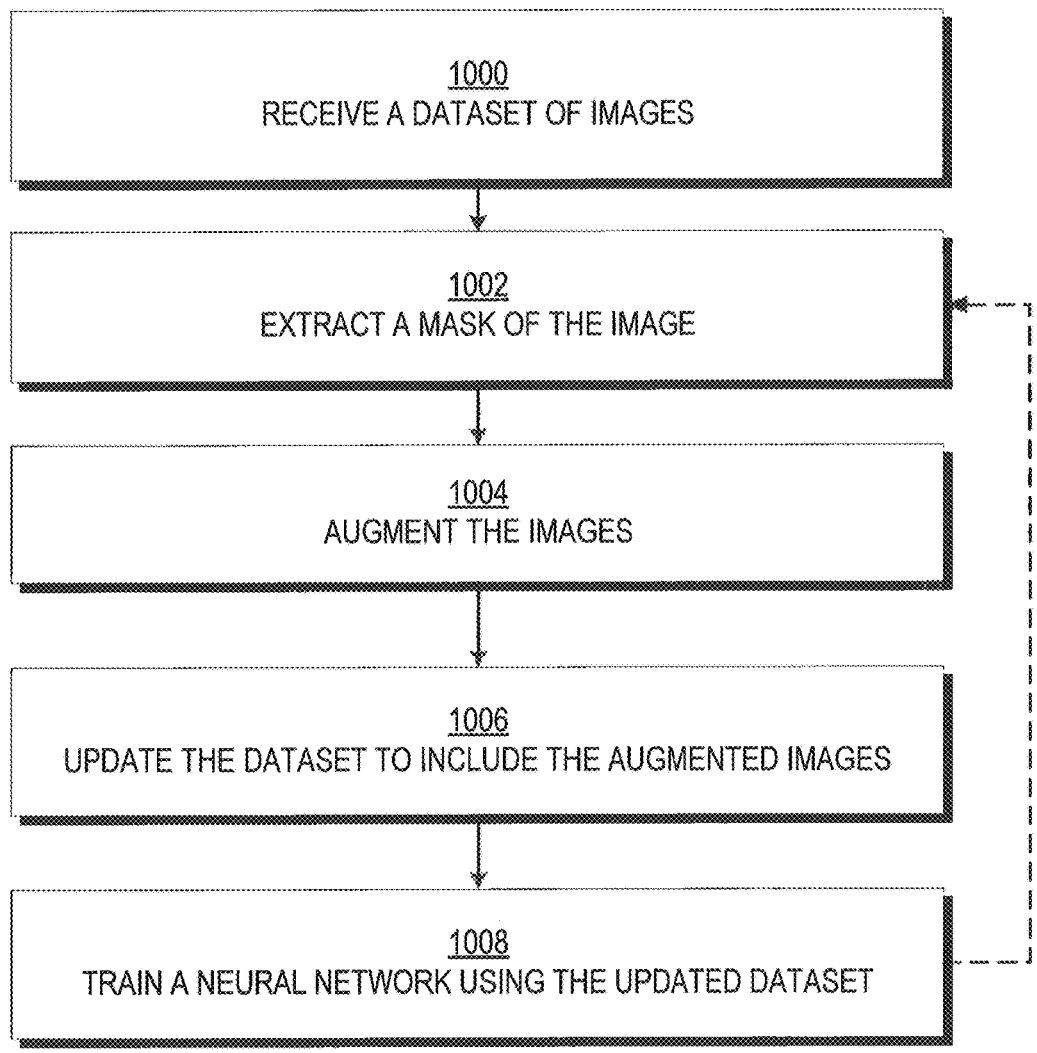
FIG. 10 is a flow chart of a process for generating an image dataset to train a neural network according to an aspect of the present disclosure.

FIG. 10 is a flow chart of a process for creating a larger dataset to train a neural network according to aspects of the present disclosure. The process is implemented by processing device through a component of a neural network (e.g., the representation generator 102A) or a computing device implementing a neural network. However, other implementations are possible without departing from the scope of the present disclosure.

In block 1000, a dataset of images is received. In some aspects, the dataset of images corresponds to the batch 900 of images illustrated in FIG. 9. In other aspects, additional and alternative aspects, the dataset of images includes a gallery of stock photos stored as image files in a storage device accessible to the neural network. The dataset of images includes images of any object or background, such as, but not limited to, apparel, animals, vehicles, people, indoor scenes, outdoor scenes, landscapes, textured backgrounds, or digital art backgrounds.

In block 1002, masks of objects are extracted from the images. In some aspects, the masks are manually extracted using a computing device. For example, an outline of the image is manually traced to define a boundary of the object to be extracted to form the mask. In additional and alternative aspects, the mask of the objects are automatically extracted. For example, the neural network is trained to recognize certain categories of objects and automatically extract a mask of the object from the image. In some aspects, the process described here in FIG. 10 has been previously performed to train the neural network to automatically extract objects, as described below. In some aspects, the masks are labeled to represent the category of the object present in the image. The labeling of the masks allow the neural network to be trained to detect similar objects and identity them by a particular category.

Figure 11:
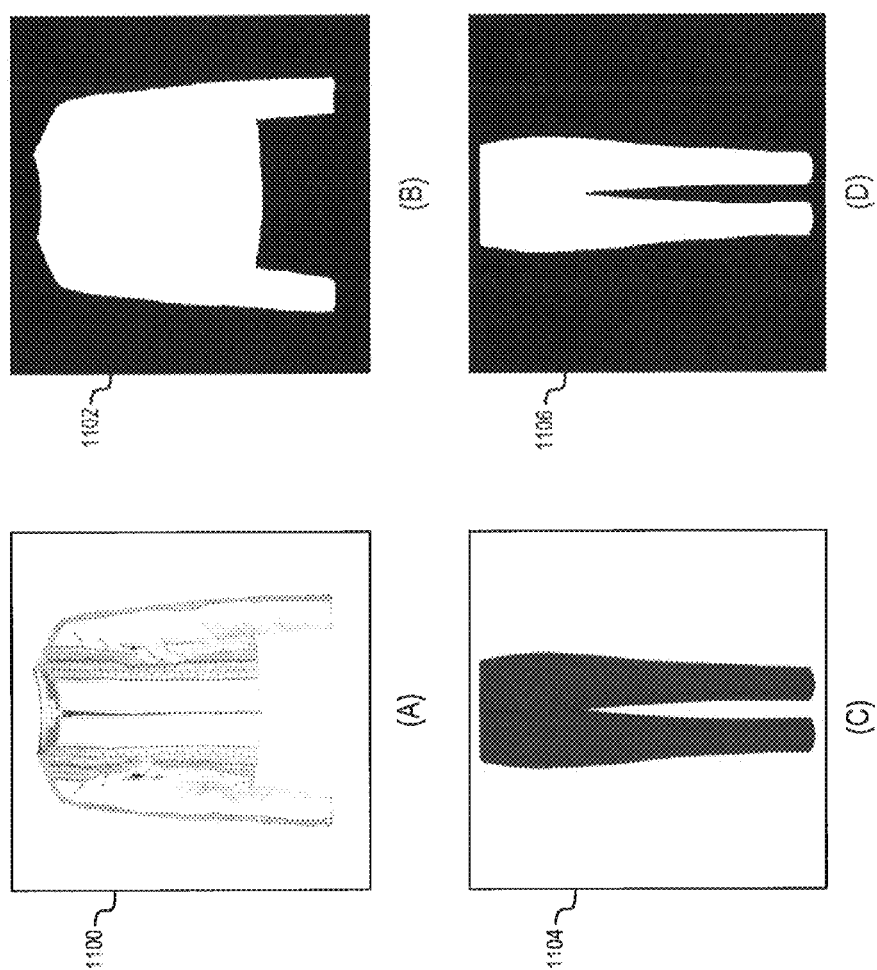
FIG. 11 provides images illustrating examples of images and corresponding masks according to aspects of the present disclosure.

FIG. 11 illustrates examples of extracted masks according to aspects of the present disclosure. Frame A of FIG. 11 shows an image including a shirt 1100. Frame B shows a mask 1102 of the shirt 1100. The mask 1102 identifies the location of the shirt 1100 in the image of frame A. Frame C shows an image including pants 1104. Frame D shows a mask 1106 of the pants 1104 and identifies the location of the pants 1104 in the image of frame C.

Returning to FIG. 10, in block 1004, the images are augmented. Augmenting the images involves placing cutout objects from the masked images onto various background images. In some aspects, augmenting the images also distorts the objects. Examples of distortions include, but are not limited to, affine transformations, tear, blurring (e.g., lens blur, motion blur), noise, pillar-box, transparency, adjusting lighting or resolution, and occlusion. In one example occlusion distortion is performed by pasting multiple objects on the background images with some overlap to block one or more or the objects. Creating images containing multiple objects help to train a robust network that can identify fine differences between objects. Occlusion includes segmenting the masked objects into super-pixels using a mean shift algorithm or removing or darkening a few segments of the masked objects at random.

Figure 12:
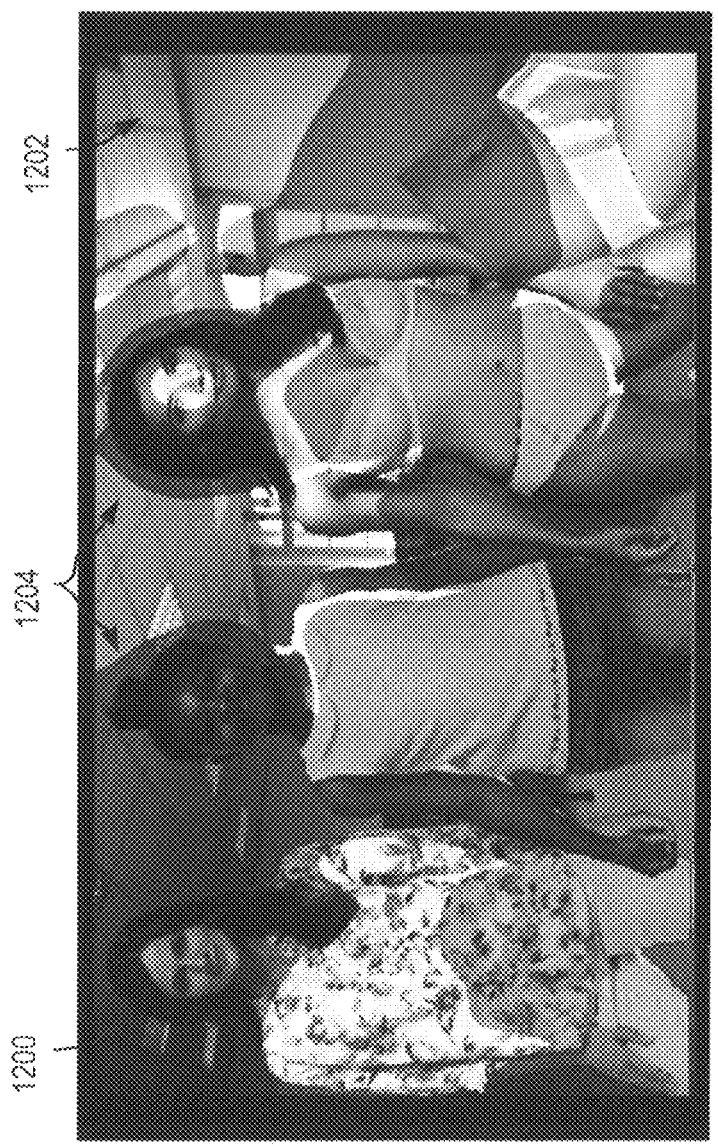
FIG. 12 is an example of an augmented mask overlaid onto a background image according to aspects of the present disclosure.

FIG. 12 illustrates an example of a synthetic image created by augmenting an image from the dataset as described in block 1004 of FIG. 10. The image includes a cutout 1200 of a masked image overlaid onto a background image 1202. Additional cutouts 1204 of other images are also included in the image to clutter the synthetic image for fine-grain training of the neural network. The additional cutouts 1204 are also partially occluded (e.g., overlapping) with each other and the cutout 1200.

Returning to FIG. 10, in block 1006, the dataset is updated to include the augmented images created in block 1004. In some aspects, a storage location from which the dataset was saved is updated to include files corresponding to the augmented images.

In block 1008, the neural network is trained using the updated dataset. In some aspects, the neurons of the neural network are trained on various location-sensitive, objective functions derived from the masks generated in block 1004. Non-limiting examples of objective functions include bounding box regression, course label prediction, and fine object masks. In some aspects, the updated dataset of images is used to train the neural network to identify a location of query objects 106 in a search medium 108 as described in the process of FIG. 8. In other aspects, the updated dataset of images is used to train the neural network for other tasks separate from locating query objects 106 in a search medium 108. In additional and alternative aspects, the updated dataset is used to automatically extract a mask of additional images in the dataset to further expand the number of images in the dataset, as indicated by the dotted arrow in FIG. 10 returning to block 1002. For example, the network is trained to produce a semantic segmentation of an input image. Semantic segmentation includes the task of labeling each pixel of an image with the label of the object class to which the pixel belongs. The set of pixels in a single label forms a mask of the object. The automated extraction of the masks allows for fine-tuning or re-training of the neural network on updated information input into the network.

Exemplary Computing Environment

Figure 13:
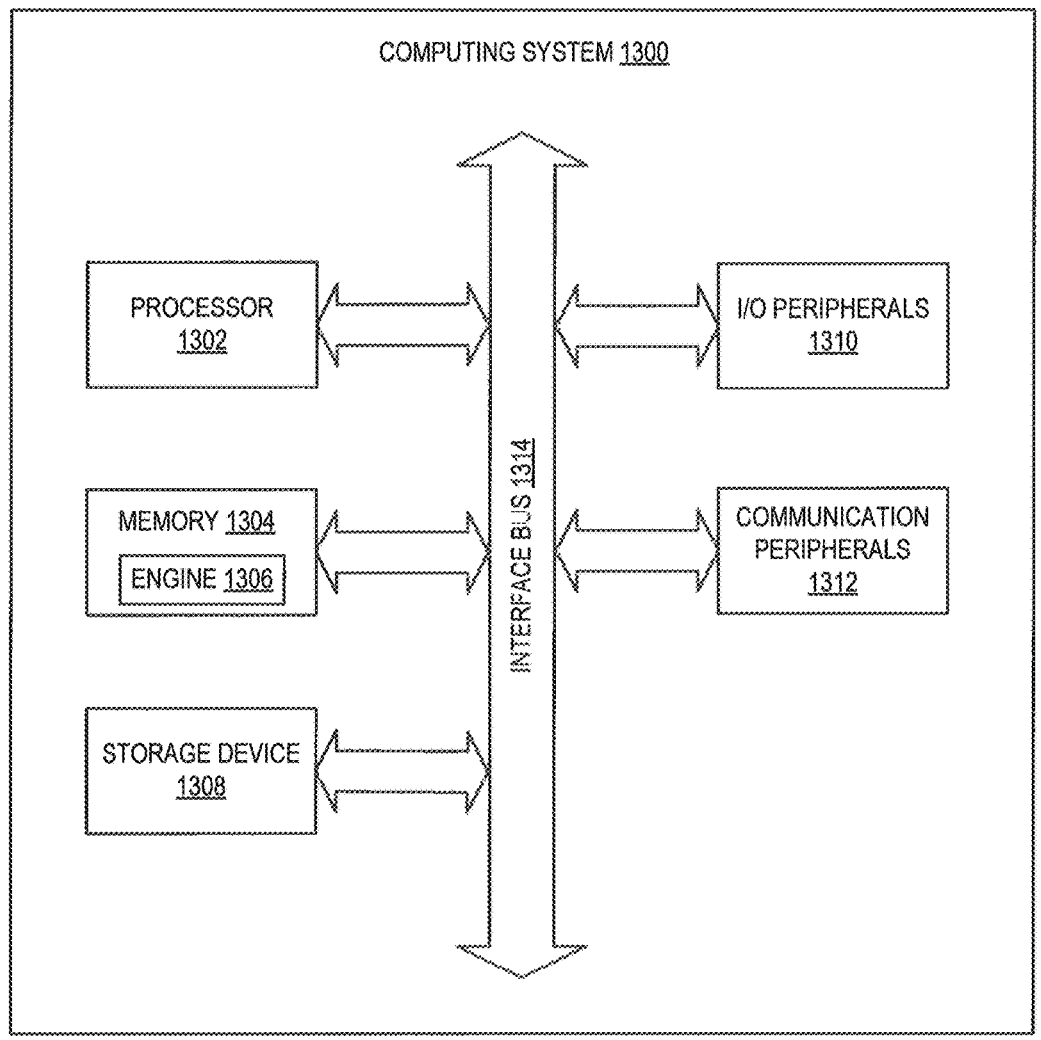
FIG. 13 illustrates an example of a computing environment suitable for use in embodiments of the present disclosure.

Any suitable computing system or group of computing systems can be used to implement the techniques and methods disclosed herein. For example, FIG. 13 illustrates examples of components for implementing some or all of the components of a computer system 1300. The computer system 1300 is used to implement any components of the neural networks to perform the operations and processes described in FIGS. 1-12. In an example, the computer system 1300 implements the representation generators 102A, 102B and the search layer 104 of FIG. 1. Although these components are illustrated as belonging to a same computing system 1300, the computing system 1300 can be distributed.

The computing system 1300 includes at least a processor 1302, a memory 1304, a storage device 1308, input/output peripherals 1310, communication peripherals 1312, and an interface bus 1314. The interface bus 1314 is configured to communicate, transmit, and transfer data, controls, and commands among the various components of the computing system 1300. The memory 1304 and the storage device 1308 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure, such as engine 1306 for implementing a convolutional neural network. The memory 1304 and the storage device 1308 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1300.

Further, the memory 1304 includes an operating system, programs, and applications. The processor 1302 is configured to execute stored instructions and includes, for example, a logical processing unit, a microprocessor, a digital signal processor, and other processors. One or both of the memory 1304 and the processor 1302 can be virtualized and can be hosted within another computing system of, for example, a cloud network or a datacenter. The input and output peripherals 1310 include user interfaces such as a keyboard, screen, microphone, speaker, other input/output devices, and computing components such as graphical processing units, serial ports, parallel ports, universal serial bus, and other input/output peripherals. The input/output peripherals 1310 are connected to the processor 1302 through any of the ports coupled to the interface bus 1314. The communication peripherals 1312 are configured to facilitate communication between the computing system 1300 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for automatically identifying a query object within a visual medium, wherein the method includes one or more processing devices performing operations comprising:
   receiving, as input to a neural network, a query object and a visual medium including the query object;
   generating, from a first subset of layers in the neural network, representations of the query object and the visual medium defining features of the query object and the visual medium;
   generating a plurality of heat maps by applying a second subset of layers in the neural network to the representations, wherein the plurality of heat maps include (i) a first heat map generated from a first combination of a first query object representation and a first visual medium representation and (ii) a second heat map generated from a second combination of a second query object representation and a second visual medium representation;
   pooling the first heat map and the second heat map to create a set of concatenated layers;
   generating an output heat map from the set of concatenated layers, wherein the output heat map identifies a location of pixels corresponding to the query object within the visual medium; and
   generating an updated visual medium using the output heat map to highlight the query object within the visual medium.

2. The method of claim 1, wherein generating the representations of the query object and the visual medium comprises generating:
   a first vector having numerical values corresponding to the features of the query object, and
   a second vector having numerical values corresponding to the features of the visual medium.

3. The method of claim 1, wherein the representations include a first representation of the query object and a second representation of the visual medium,
   wherein generating the plurality of heat maps includes convolving the first representation with overlapping regions of the second representation.

4. The method of claim 1, wherein the query object depicts a particular item and wherein the visual medium includes a video in which the particular item is depicted as visually distorted from the query object.

5. The method of claim 1, further comprising training, using a batch of images, neurons in the neural network to identify pixels corresponding to the query object within the visual medium.

6. The method of claim 5, further comprising expanding an amount of the images included in the batch of images by performing operations comprising:
   extracting a mask corresponding to at least one image of the images included in the batch;
   generating a synthetic image including an augmentation of the at least one image; and
   updating the batch to include the synthetic image.

7. A method for automatically identifying a query object within a visual medium, wherein the method includes one or more processing devices performing operations comprising:
   training a neural network to identify pixels corresponding to a query object within the visual medium by performing operations comprising:
      generating batch representations of a query set of images in a batch of images and a search set of images in the batch of images;
      reshaping a respective layer of the batch representations for each of the query set of images and the search set of images;
      convolving the query set and the search set to generate a convolved set of the batch representations representing a true mask; and
      minimizing a result of a loss function by updating the neural network based on a difference between (i) the true mask generated by convolving the query set and the search set and (ii) an expected value of the true mask;
   generating, from the trained neural network, representations of the query object and the visual medium defining features of the query object and the visual medium;
   generating, from the representations, a heat map that identifies a location of pixels corresponding to the query object within the visual medium; and
   updating, based on the heat map, the visual medium to highlight the query object.

8. The method of claim 7, wherein the training further comprises:
   reshaping the convolved set of the batch representations, the reshaping comprising altering a dimension of the convolved set; and
   normalizing the batch representations.

9. The method of claim 7, further comprising:
   inputting a query object and a visual medium into the trained neural network; and
   receiving, from the trained neural network, an output heat map that highlights the query object within the visual medium.

10. The method of claim 9, further comprising:
    generating an updated visual medium using the output heat map to highlight the query object within the visual medium.

11. The method of claim 7, further comprising providing the reshaped convoluted set to an additional convolutional neural network, wherein the additional convolutional neural network is trained to generate a heat map identifying the location of the query object in a search medium.

12. The method of claim 7, further comprising expanding an amount of the images included in the query set of images and the search set of images by performing operations comprising:
- extracting a mask corresponding to at least one image of the images included in the query set of images or the search set of images;
- generating a synthetic image including an augmentation of the at least one image; and
- updating one of (i) the query set of images or (ii) the search set of images to include the synthetic image.

13. A system, comprising:
- a processor; and
- a non-transitory computer-readable medium communicatively coupled to the processor, the processor being configured to execute programming code stored in the non-transitory computer-readable medium and thereby cause the processor to perform operations comprising:
  - receiving, as input to a neural network, a query object and a visual medium including the query object,
  - generating, from a first subset of layers in the neural network, representations of the query object and the visual medium defining features of the query object and the visual medium,
  - generating a plurality of heat maps by applying a second subset of layers in the neural network to the representations, wherein the plurality of heat maps include (i) a first heat map generated from a first combination of a first query object representation and a first visual medium representation and (ii) a second heat map generated from a second combination of a second query object representation and a second visual medium representation,
  - pooling the first heat map and the second heat map to create a set of concatenated layers,
  - generating an output heat map from the set of concatenated layers, wherein the output heat map identifies a location of pixels corresponding to the query object within the visual medium, and
  - generating an updated visual medium using the output heat map to highlight the query object within the visual medium.

14. The system of claim 13, wherein the operations further comprise training a neural network to identify pixels corresponding to a query object within the visual medium.

15. The system of claim 13, wherein generating the representations of the query object and the visual medium include generating a first vector having numerical values corresponding to the features of the query object and a second vector having numerical values corresponding to the features of the visual medium.

16. The system of claim 13, wherein the representations include a first representation of the query object and a second representation of the visual medium,
wherein generating the plurality of heat maps using the representations includes convolving the first representation with overlapping regions of the second representation.

17. The system of claim 13, wherein the operations further comprise training, using a batch of images, neurons in the neural network to identify pixels corresponding to the query object within the visual medium.

18. The system of claim 17, wherein operations further comprise expanding a number of images included in the batch of images by performing additional operations comprising:
- extracting a mask corresponding to at least one image of the images included in the batch;
- generating a synthetic image including an augmentation of the at least one image; and
- updating the batch to include the synthetic image.

19. The system of claim 13, wherein the query object depicts a particular item and wherein the visual medium includes a video in which the particular item is depicted as visually distorted from the query object.

* * * * *